3,470,182
4-AMINO-SUBSTITUTED QUINAZOLINES
Goetz E. Hardtmann, Florham Park, and Hans Ott, Convent Station, N.J., assignors to Sandoz Inc., Hanover, N.J.
No Drawing. Filed Feb. 9, 1967, Ser. No. 614,813
Int. Cl. C07d 51/48, 51/72; A61k 27/00
U.S. Cl. 260—256.4
8 Claims

ABSTRACT OF THE DISCLOSURE

There are disclosed various 4-amino-substituted quinazolines, which are central nervous system stimulants and may be used as antidepressants.

---

This invention relates to bicyclic compounds. In particular, the invention pertains to 4-substituted quinazolines and a method for preparing the same.

The quinazolines of the present invention may be represented structurally as follows:

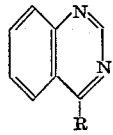

wherein R represents 4-lower alkylpiperazino, the lower alkyl substituent preferably containing from 1 to 4 carbon atoms, e.g., 4-methylpiperazino and 4-ethylpiperazino; 4-($\beta$ - hydroxyethyl)piperazino; 4 - phenylpiperazino; 1 - lower alkyl-4-piperidylamino, the lower alkyl substituent preferably containing from 1 to 4 carbon atoms, e.g., 1-methyl-4-piperidylamino and 1-ethyl-4-piperidylamino; hexamethylenimino; heptamethylenimino; $\omega$-(2 - pyridyl)lower alkylamino, the lower alkyl substituent preferably containing from 1 to 4 carbon atoms, e.g., $\beta$-(2-pyridyl) ethylamino and $\gamma$-(2-pyridyl)propylamino; $\omega$-(3-indolyl)lower alkylamino, the lower alkyl substituent preferably containing from 1 to 4 carbon atoms, e.g., $\beta$-(3-indolyl)ethylamino and $\gamma$-(3-indolyl) propylamino; 1-indanylamino or 2-indanylamino.

The above compounds are prepared by reacting a 4-haloquinazoline, the halo substituent preferably being chloro or bromo, with an appropriate amine of the formula RH, wherein R is as defined above, as illustrated by the following reaction scheme:

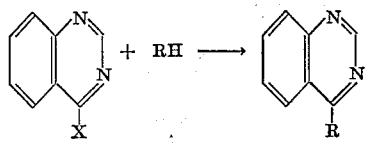

wherein R is as previously defined and X represents halo, preferably chloro or bromo.

The reaction may be carried out at room temperature (20–25° C.) or at elevated temperatures up to reflux temperature. The particular temperature employed will for the most part be dependent upon the reactivity of the amine. The reaction can be carried out in the presence of an inert organic solvent, e.g., methylene chloride, benzene, toluene and xylene. However, the use of a solvent is not necessary since an excess of the amine can be employed for this purpose. When a solvent is employed it is preferred to carry out the reaction in the presence of a tertiary amine, e.g., triethylamine and the like, to take up the hydrogen halide liberated during the reaction. When the reaction is carried out employing an excess of the amine reactant in lieu of a solvent a sufficient excess thereof is employed to also take up the liberated hydrogen halide. The resulting products are readily recovered employing conventional techniques.

The reactants employed in the above process are either known and can be prepared as described in the literature or can be prepared from available materials in analogous manner.

The compounds of structural Formula I are useful because they possess pharmacological activity in animals. In particular, the compounds are central nervous system stimulants and can be used as antidepressants. For such usage the compounds can be admixed with conventional pharmaceutical carriers or diluents and administered internally in the form of tablets, capsules, elixirs, solutions, emulsions or suspensions. The compounds may also be administered in the form of their non-toxic pharmaceutically acceptable acid addition salts. Such salts possess the same order of activity as the free base, are readily prepared by reacting the base with an appropriately suitable acid and accordingly are included within the scope of this invention. Representative of such salts are the hydrochloride, hydrobromide, sulfate, phosphate, oxalate, citrate, tartrate, methane sulfonate and p-toluenesulfonate. The dosage administered will, of course vary depending upon the compound employed and mode of administration (oral or parenteral). However, in general, satisfactory results are obtained when administered at a daily dosage of from about 10 milligrams to about 30 milligrams per kilogram of body weight preferably given in divided doses 2 to 4 times a day or in sustained release form. For larger mammals as well as the smaller domestic mammals, dosage forms suitable for internal administration comprise from about 25 milligrams to about 300 milligrams of the compound admixed with a solid or liquid pharmaceutical carrier or diluent.

A representative formulation for oral administration is a tablet (prepared by standard tableting techniques) and containing the following ingredients.

| Ingredient: | Parts by wt. |
|---|---|
| 4-(4-methylpiperazino)quinazoline | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

4-(4-methylpiperazino)quinazoline

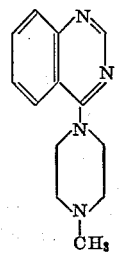

To a solution of 6 g. of 4-chloroquinazoline in 75 ml. of methylene chloride at 0 to 10° C. is added 10.5 g. of 4-methylpiperazine. The resulting mixture is stirred for 1 hour while maintaining the reaction temperature between 0 and 10° C., then washed twice with 50 ml. (each) of water and then dried over anhydrous sodium sulfate and evaporated in vacuo to obtain 4-(4-methylpiperazino) quinazoline as an oil.

The dihydrochloride salt thereof, M.P. 290–294° C., is obtained by treating a cooled (ice bath) solution of the oil in 100 ml. of methylene chloride with hydrogen chloride gas, precipitating the salt by the addition of 100 ml. of diethyl ether, recovering the salt by filtration and recrystallizing the same from methylene chloride.

EXAMPLE 2

4-[4-(β-hydroxyethyl)piperazino]quinazoline

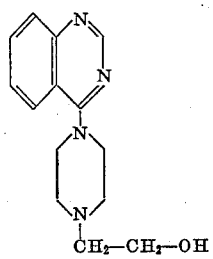

To a solution of 12 g. of 4-chloroquinazoline in 200 ml. of methylene chloride is added 11.4 g. of 4-(β-hydroxyethyl)piperazine and 17.8 g. of triethylamine. The resulting mixture is stirred at room temperature for 1 hour, then washed twice with 50 ml. (each) of water and then dried over anhydrous sodium sulfate and evaporated in vacuo to obtain 4-[4-(β-hydroxyethyl)piperazino] quinazoline as an oil.

The dihydrochloride salt thereof, M.P. 241–243° C., is obtained by treating a cooled (ice bath) solution of the oil in 150 ml. of methylene chloride with hydrogen chloride gas, precipitating the salt by the addition of diethyl ether, recovering the salt by filtration and recrystallization the same from methylene chloride.

EXAMPLE 3

4-(4-phenylpiperazino)quinazoline

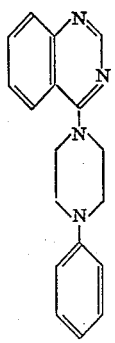

To a solution of 12 g. of 4-chloroquinazoline in 50 ml. of chloroform is added 17.4 g. of triethylamine and 14.2 g. of 4-phenylpiperazine. The resulting mixture is stirred at room temperature for 1 hour, then washed twice with 50 ml. (each) of water and then dried over anhydrous sodium sulfate and evaporated in vacuo to obtain 4-(4-phenylpiperazino)quinazoline as an oil.

The hydrochloride salt thereof, M.P. 225–230° C., is obtained by treating a cooled (ice bath) solution of the oil in 150 ml. of chloroform with hydrogen chloride gas, precipitating the salt by the addition of diethyl ether, recovering the salt by filtration and recrystallizing the same from methylene chloride.

EXAMPLE 4

4-(1-methyl-4-piperidylamino)quinazoline

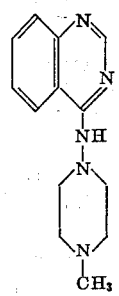

A solution of 8 g. of 4-chloroquinazoline and 18 g. of 1-methyl-4-aminopiperidine in 150 ml. of benzene is stirred for 15 hours at room temperature and then evaporated in vacuo. The residue is dissolved in chloroform and the resulting solution extracted twice with 50 ml. (each) of water and then evaporated in vacuo. The residue is crystallized from benzene to obtain 4-(1-methyl-4-piperidylamino)quinazoline, M.P. 179–181° C.

The dihydrochloride salt thereof, M.P. 297–300° C., is prepared by treating the base with hydrogen chloride gas in conventional manner.

EXAMPLE 5

4-[[β-(2-pyridyl)ethyl]amino]quinazoline

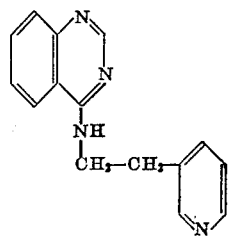

To a solution of 11 g. of 4-chloroquinazoline in 75 ml. of benzene is added 19 g. of 2-(β-aminoethyl)pyridine. The resulting mixture is stirred for 2 hours at room temperature and then evaporated in vacuo. The residue is dissolved in chloroform and the resulting solution washed once with 150 ml. of 10% aqueous sodium bicarbonate solution, then three times with 100 ml. (each) of water and then evaporated in vacuo to obtain 4-[[β-(2-pyridyl)ethyl]amino]quinazoline, M.P. 204–207° C.

EXAMPLE 6

4-(2-indanylamino)quinazoline

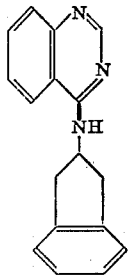

To a solution of 12.5 g. of 4-chloroquinazoline in 120 ml. of benzene is added 22.5 g. of triethylamine and 15 g. of 2-aminoindane hydrochloride. The resulting mixture is refluxed for 5½ hours and then evaporated in vacuo. The residue is dissolved in chloroform and the resulting solution washed once with 150 ml. of 10% aqueous bicarbonate solution, then three times with 100 ml. (each) of water and then evaporated in vacuo to obtain 4-(2-indanylamino)quinazoline, M.P. 204–207° C.

EXAMPLE 7

4-[[β-(3-indolyl)ethyl]amino]quinazoline

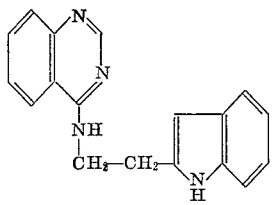

To a solution of 12 g. of 4-chloroquinazoline in 125 ml. of benzene is added 21.6 g. of triethylamine and 17 g. of tryptamine hydrochloride. The resulting mixture is refluxed for 5 hours and then evaporated in vacuo. The residue is dissolved in chloroform and the resulting solution washed once with 150 ml. of 10% aqueous sodium bicarbonate solution, then three times with 100 ml. (each) of water and then evaporated in vacuo to obtain 4-[[β-(3-indolyl)ethyl]amino]quinazoline, M.P. 162–170° C.

What is claimed is:

1. A compound selected from the group of quinazolines of the formula

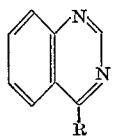

and the pharmaceutically acceptable acid addition salts thereof, wherein R represents 4-lower alkylpiperazino, 4-phenylpiperazino, 4-(β-hydroxyethyl)piperazino, 1-lower alkyl-4-piperidylamino, hexamethylenimino, heptamethylenimino, ω-(2-pyridyl)lower alkylamino, ω-(3-indolyl) lower alkylamino, 1-indanylamino or 2-indanylamino.

2. The compound of claim 1 which is 4-(4-methylpiperazino)quinazoline.
3. The compound of claim 1 which is 4-(1-methyl-4-piperidylamino)quinazoline.
4. The compound of claim 1 which is 4-[[β-(2-pyridyl)ethyl]amino]quinazoline.
5. The compound of claim 1 which is 4-[[β-(3-indolyl)ethyl]amino]quinazoline.
6. The compound of claim 1 which is 4-(2-indanylamino)quinazoline.
7. The compound of claim 1 which is 4-[4-(β-hydroxyethyl)piperazino]quinazoline.
8. The compound of claim 1 which is 4-(4-phenylpiperazino)quinazoline.

References Cited

UNITED STATES PATENTS

| | | | |
|---|---|---|---|
| 3,184,462 | 5/1965 | Scarborough et al. | 260—256.4 |
| 3,301,855 | 1/1967 | Blatter | 260—256.4 |

OTHER REFERENCES

Szymanska et al., Chem. Abstracts, vol. 63 (1965), col. 10519.

ALEX MAZEL, Primary Examiner

R. J. GALLAGHER, Assistant Examiner

U.S. Cl. X.R.

260—256.5; 424—251